United States Patent
Sulejmani et al.

(10) Patent No.: US 10,261,245 B2
(45) Date of Patent: Apr. 16, 2019

(54) MICROSTRUCTURED OPTICAL FIBRE, COMPOSITE STRUCTURE, METHOD AND USE FOR MEASURING SHEAR LOAD IN A COMPOSITE STRUCTURE

(71) Applicant: VRIJE UNIVERSITEIT BRUSSEL, Brussels (BE)

(72) Inventors: Sanne Sulejmani, Ixelles (BE); Thomas Geernaert, Buggenhout (BE); Francis Berghmans, Westerlo (BE); Hugo Thienpont, Gooik (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 145 days.

(21) Appl. No.: 15/111,885

(22) PCT Filed: Jan. 16, 2015

(86) PCT No.: PCT/EP2015/050750
§ 371 (c)(1),
(2) Date: Jul. 15, 2016

(87) PCT Pub. No.: WO2015/107143
PCT Pub. Date: Jul. 23, 2015

(65) Prior Publication Data
US 2016/0341891 A1 Nov. 24, 2016

(30) Foreign Application Priority Data
Jan. 17, 2014 (EP) .................................... 14151672

(51) Int. Cl.
*G02B 6/02* (2006.01)
*G01D 5/353* (2006.01)
(Continued)

(52) U.S. Cl.
CPC ....... *G02B 6/02357* (2013.01); *G01D 5/3538* (2013.01); *G01L 1/242* (2013.01);
(Continued)

(58) Field of Classification Search
CPC .................................................. G02B 6/02357
See application file for complete search history.

(56) References Cited

U.S. PATENT DOCUMENTS

2006/0197012 A1    9/2006  Udd et al.
2012/0224811 A1*   9/2012  Geernaert .......... G02B 6/02109
                                                           385/37

FOREIGN PATENT DOCUMENTS

WO          0239159 A1    5/2002
WO       2011061309 A1    5/2011

OTHER PUBLICATIONS

Jin et al., "Progress Towards an Orthogonal Strain State Sensor Based Optical Fiber Technology," SPIE Conference on Sensory Phenomena and Measurement Instrumentation, Mar. 1999, p. 516-531, vol. 3670.

(Continued)

*Primary Examiner* — Clayton E. LaBalle
*Assistant Examiner* — Dennis Hancock
(74) *Attorney, Agent, or Firm* — Workman Nydegger

(57) ABSTRACT

A microstructured optical fiber comprises a doped core region embedded in a cladding layer, and a plurality of longitudinal tubes, wherein a radial cross-section of the optical fiber comprises a central hexagonal portion comprising a plurality of holes arranged according to a hexagonal grid surrounding a core section. Each hole corresponds to a respective tube, within a hexagonal boundary of the grid, and the plurality of holes comprises holes of first and second types arranged in a biaxial mirror-symmetric configuration. The holes of the first type are arranged in two side holey (Continued)

structures comprising distinct sub-grids of the hexagonal grid, defined by respective outer boundaries corresponding to portions of the hexagonal boundary of the grid and respective inner boundaries. Outer tangential lines to the respective inner boundaries cross each other at the opposed side of the core with respect to the side of the respective side holey structure.

12 Claims, 13 Drawing Sheets

(51) Int. Cl.
    *G01L 1/24*           (2006.01)
    *G02B 6/12*           (2006.01)

(52) U.S. Cl.
    CPC ..... *G02B 6/02109* (2013.01); *G02B 6/02338* (2013.01); *G02B 6/02352* (2013.01); *G02B 2006/12138* (2013.01)

(56) References Cited

OTHER PUBLICATIONS

Szpulak et al., "Highly Birefringent Photonic Crystal Fibre with Enhanced Sensitivity to Hydrostatic Pressure," IEEE International Conference on Transparent Optical Networks, Jun. 1, 2006, p. 174-177.
Geernaert et al., "Fiber Bragg Gratings in Germanium-Doped Highly Birefringent Microstructured Optical Fibers," IEEE Photonics Technology Letters, Apr. 15, 2008, p. 554-556, vol. 20, No. 8.
Geernaert et al., "Transversal load Sensing With Fiber Bragg Gratings in Microstructured Optical Fibers," IEEE Photonics Technology Letters, Jan. 1, 2009, p. 6-8, vol. 21, No. 1.
Geernaert et al., "Bragg Grating Inscription in GeO2-Doped Microstructured Optical Fibers," Journal of Lightwave Technology, May 15, 2010, p. 1459-1467, vol. 28, No. 10.
Luyckx et al., "Response of FBGs in Microstructured and Bow Tie Fibers Embedded in Laminated Composite," IEEE Photonics Technology Letters, Sep. 15, 2009, p. 1290-1292, vol. 21, No. 18.
Wojcik et al., "Technology of High Birefringent Photonic Crystal Fibers for Sensing Applications," Proceedings of SPIE, Apr. 23, 2006, p. 1-9, vol. 6189.
Yan et al., "Development of Flexible Pressure Sensing Polymer Foils Based on Embedded Fibre Bragg Grating Sensors," Procedia Engineering, Jan. 1, 2010, p. 272-275, vol. 5.
Hesske et al., "Preliminary Results of an Experimental Verification of Shear Strain Influence on Fibre Bragg Grating Reflection Spectra," Photonics 2010: Tenth International Conference on Fiber Optics and Photonics, Dec. 29, 2010, p. 1-7, vol. 8173.
Sonnenfeld et al., "Microstructured Optical Fiber Sensors Embedded in a Laminate Composite for Smart Material Applications," Sensors, Feb. 28, 2011, p. 2566-2579, vol. 11.
Sulejmani et al., "Shear Stress Sensing with Bragg Grating-Based Sensors in Microstructure Optical Fibers," Opyics Express 20404, Aug. 22, 2013, p. 20404-20416, vol. 21, No. 17.
Extended European Search Report from corresponding EP Application No. 14151672.4, dated Apr. 14, 2014.
International Search Report from corresponding PCT Application No. PCT/EP2015/050750, dated Apr. 21, 2015.
European Office Communication from EP Application No. EP 15 701 717.9, dated Mar. 20, 2018.
Kawanishi et al., "Polarization Maintaining Holey Optical Fiber," Journal of the Institute of Electronics, 2000 Society Conference of IEICE, Sep. 7, 2000, p. 376.

* cited by examiner

Fig. 1 – prior art

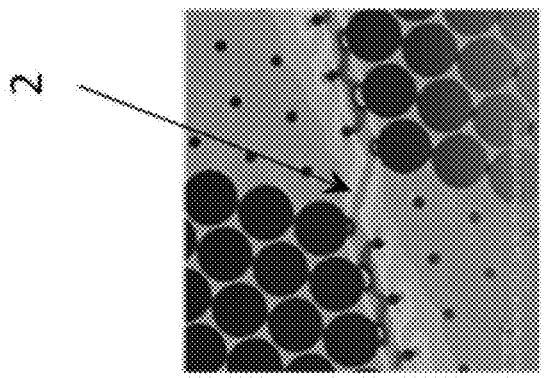
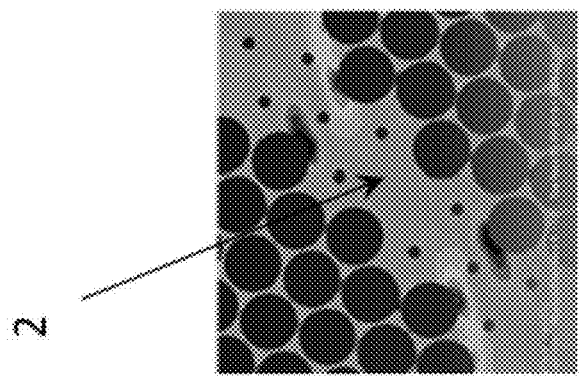
Fig. 6

MICROSTRUCTURED OPTICAL FIBRE, COMPOSITE STRUCTURE, METHOD AND USE FOR MEASURING SHEAR LOAD IN A COMPOSITE STRUCTURE

TECHNICAL FIELD

The present disclosure relates to microstructured optical fibres (MOFs), composite structures comprising such fibres, and methods for measuring shear load in a composite structure by means of such fibres.

BACKGROUND ART

Microstructured optical fibres are known, and can be used for instance for sensing transverse load based on their birefringent properties. An example of such a structure is for instance disclosed in WO2011/061309, which includes a "butterfly MOF" described in relation with FIG. 2.

Another example is disclosed in the paper "Highly Birefringent Photonic Crystal Fibre with Enhanced Sensitivity to Hydrostatic Pressure", Szpulak M. et al, ICTON 2006, proceedings page 174-177, for instance disclosing a "V-fibre MOF" in relation with FIG. 1C.

Recently, it has moreover been recognised that measuring shear stress or shear load sensing can be performed with Bragg grating-based sensors in microstructured optical fibres, which are embedded in a host material, as disclosed in "Shear stress sensing with Bragg grating-based sensors in microstructured optical fibers", Sulejmani S. et al., OPTICS EXPRESS 20404, 22 Aug. 2013. The study described herein is based on a "butterfly MOF" structure.

The use of the "butterfly MOF" for shear load sensing as described in Sulejmani S. et al still results in a substantial sensitivity to transverse load, which causes a relatively large cross-sensitivity between the transverse load and shear load, which makes it more difficult to precisely determine the actual level of shear load.

There exists a need for MOF structures which provide an increased shear load sensitivity and selectivity with respect to the prior art structures, and which at the same time limit sensitivity to transverse load when embedded in a host material.

SUMMARY OF THE DISCLOSURE

It is an aim of the present disclosure to provide a MOF structure which provides an increased shear load sensitivity and selectivity with respect to the prior art structures, and which at the same time limit sensitivity to transverse load when embedded in a host material.

This aim is achieved according to the disclosure with the MOF structure showing the technical characteristics of the first independent claim.

It is another aim of the present disclosure to provide a composite structure comprising such a MOF structure, and method for measuring shear load in such a composite structure by means of such a MOF.

According to a first aspect of the present invention, a microstructured optical fibre (MOF) is disclosed, comprising a doped core region embedded in a cladding layer, and comprising a plurality of longitudinal tubes, wherein a radial cross-section of the optical fibre comprises a central hexagonal portion comprising a plurality of holes arranged according to a hexagonal grid surrounding a core section, each hole corresponding to a respective tube, within a hexagonal boundary of the grid, the plurality of holes comprising holes of a first type and holes of a second type and arranged in a biaxial mirror-symmetric configuration, wherein the holes of the first type are arranged in two side holey structures comprising distinct sub-grids of the hexagonal grid, each of the side holey structures being defined by respective outer boundaries corresponding to portions of the hexagonal boundary of the grid and respective inner boundaries, characterized in that outer tangential lines to the respective inner boundaries cross each other at the opposed side of the core with respect to the side of the respective side holey structure.

It is an advantage that a MOF having this special orientation of the tangential lines, for both holey structures, causes a reduced sensitivity to transverse load in the core region of the fibre when embedded. At the same time sensitivity to shear load is improved.

According to preferred embodiments, the holes of a first type have a diameter which is larger than a diameter of the holes of the second type. Preferably, the diameter of the holes of the first type is larger than 3 times, or larger than 3.5 times, the diameter of the holes of the second type.

According to preferred embodiments, the side holey structures are defined by outer boundaries defining a shape of the rhomb type.

According to preferred embodiments, the angle under which the centre of the core sees the side holey structures, i.e. each whole side holey structure, is larger than 120°. This angle can be defined, for instance clearly represented in a radial cross-section view, as the largest angle which can be defined between two straight lines connecting the centre of the core and respective outer surfaces of two air holes of the first type in the respective side holey structure.

Each of the respective side holey structures preferably comprises three grid positions directly adjacent to the core section. Preferably, the central grid position of these three grid positions comprises a hole of the first type. Preferably, the two outer grid positions of these three grid positions can comprise no holes (are left closed), can comprise holes of the second type, or can comprise holes of a third type. The holes of the third type can be for instance larger in diameter than the second type of holes and smaller in diameter than the first type of holes.

According to preferred embodiments, the holes of the second type are arranged in the central hexagonal portion at positions of the hexagonal grid where there are no holes of the first type. The holes of the second type can be arranged at positions not taken by holes of the first type in the hexagonal rings of the hexagonal grid in the central hexagonal portion. Preferably the holes of the second type can be less in number than the holes of the first type. Preferably, the holes of the second type can be arranged in a number of inner rings of the hexagonal grid in the central hexagonal portion which is smaller than the number of rings defined by the hexagonal grid/central hexagonal portion. Preferably, the holes of the first type can be arranged within the 5 (or within the 4, or within the 3, or within the 2) inner rings of the hexagonal grid only. Hexagonal grid positions in the central hexagonal portion, outside these inner rings, can be left unoccupied of holes of the second type (i.e. no holes of the second type can be present there).

According to preferred embodiments, at every grid position of the central hexagonal portion, a hole is present, except for the grid position corresponding to the core.

According to preferred embodiments, the holes are of the first type or of the second type. The holes of the first type preferably have a diameter between 3.3 μm and 5 μm, or between 3.3 μm-4 μm, typically 3.6575 μm. The holes of the second type preferably have a diameter between 0.6 μm and 2 μm, or between 0.6 μm and 1 μm, typically 0.8 μm.

According to alternative preferred embodiments, the holes are of the first type, of the second type and of a third type, the holes of the third type being present at grid positions directly adjacent to the core section. The holes of the third type preferably have a diameter between 1.6 μm and 2.4 μm, typically 2 μm.

According to preferred embodiments, the relative surface of the holes of the first type with respect to the total surface of the side holey structures is larger than 82%, which corresponds to a ratio of the diameter of the holes of the first type to the pitch of the hole lattice larger than 95%, more preferably larger than 88%, which corresponds to a ratio of the diameter of the holes of the first type to the pitch of the hole lattice larger than 99%.

According to preferred embodiments, the hexagonal grid comprises more than 4, or more than 5, or more than 6, preferably more than 7, or more than 8, or more than 9, or more than 10 or more than 11 hexagonal rings.

According to preferred embodiments, the largest hexagonal ring which comprises holes of the first type (hexagonal ring A) is larger than, or surrounds, the largest hexagonal ring which comprises holes of the second type (hexagonal ring B). According to preferred embodiments, there can be zero, one, two, three, four, five or more intermediate hexagonal rings of the hexagonal grid in between the rings A and B.

According to preferred embodiments, the MOF further comprises at least one Fibre Bragg grating formed perpendicularly on a longitudinal direction of the fibre. Grating inscription can be done using conventional ultraviolet inscription techniques, as discussed for instance in reference "Bragg grating inscription in $GeO_2$-doped microstructured optical fibers", Geernaert T. et al., JOURNAL OF LIGHTWAVE TECHNOLOGY Vol. 28 no. 10, 15 May 2010. This reference demonstrates the feasibility of grating inscription in microstructured optical fibres containing a large number of air holes of varying sizes, and with different levels of $GeO_2$-doping concentration in the core region. The first use of a fibre Bragg grating fabricated in a butterfly microstructured optical fibre, which also featured a highly asymmetric air hole geometry, for transverse load sensing, is discussed in reference "Microstructured Optical Fiber Sensors Embedded in a Laminate Composite for Smart Material Applications", Sonnenfeld C. et al., SENSORS no. 11, 28 Feb. 2011.

According to preferred embodiments, the core section has an elliptical shape.

According to preferred embodiments, the ratio of the diameter of the central hexagonal portion over the diameter of the fibre (cladding) is larger than 60%, more preferably larger than 75%, more preferably larger than 90%.

According to preferred embodiments, a microstructured optical fibre (MOF) is disclosed according to any of the previous embodiments, further comprising a set of holes of a fourth type in the cladding layer, the set of holes of the fourth type surrounding the central hexagonal portion. Preferably, the holes of the fourth type are substantially larger than the holes of the first, second and third type. The diameter of the holes of the fourth type can preferably be larger than 5 micrometer, more preferably larger than 10 micrometer, or larger than 15 micrometer.

The positions of the holes of the fourth type can correspond to positions of an hexagonal grid which corresponds to extrapolation of the hexagonal grid of the central hexagonal portion.

According to a second aspect of the present invention, a composite structure is disclosed comprising at least a first shear load sensitive direction, comprising a MOF according to any of the embodiments of the first aspect, wherein at least one mirror symmetry-axis of the MOF is oriented at an angle in between 30° and 60°, more preferably between 37° and 53°, even more preferably at an angle of about 45°, e.g. 45°+−1°, with respect to the shear load sensitive direction.

According to a third aspect of the present invention, a method is disclosed for measuring shear load in a composite structure along a shear load sensitive direction of the composite structure, comprising embedding at least one MOF according to any of the embodiments of the first aspect in the composite structure, wherein at least one mirror symmetry-axis of the MOF is oriented at an angle in between 30° and 60°, more preferably between 37° and 53°, even more preferably at an angle of about 45°, e.g. 45°+−1° with respect to the shear load sensitive direction;

allowing light of a predetermined wavelength to pass through the fibre;

measuring a level of birefringence for the light in the fibre, being indicative for the shear load in the composite structure.

According to preferred embodiments, the method comprises embedding at least three MOFs according to any of the embodiments of the first aspect of the present invention in the composite structure, wherein at least one mirror symmetry-axis of the MOFs is oriented at an angle in between 30° and 60°, more preferably between 37° and 53°, even more preferably at an angle of about 45°, e.g. 45°+−1°, with respect to the shear load sensitive direction; allowing light of respective predetermined wavelengths to pass through the respective fibres;

measuring a level of birefringence for the light in each of the fibres;

deriving a 2D shear load mapping of the composite structure, based on the level of birefringence for each of the fibres.

According to a fourth aspect of the present invention, the use of a MOF according to any of the embodiments of the first aspect of the present disclosure for measuring shear load in a composite structure is disclosed.

BRIEF DESCRIPTION OF THE DRAWINGS

The disclosure will be further elucidated by means of the following description and the appended figures.

FIGS. 6 (a) and (b) illustrates an aspect of the present invention by comparing a cross-section near the core region of a micro-machined optical fibre according to embodiments of the present invention with a radial cross-section of a prior art micro-machined optical fibre being a "V-fibre MOF".

DETAILED DESCRIPTION OF PREFERRED EMBODIMENTS

Figure 1:
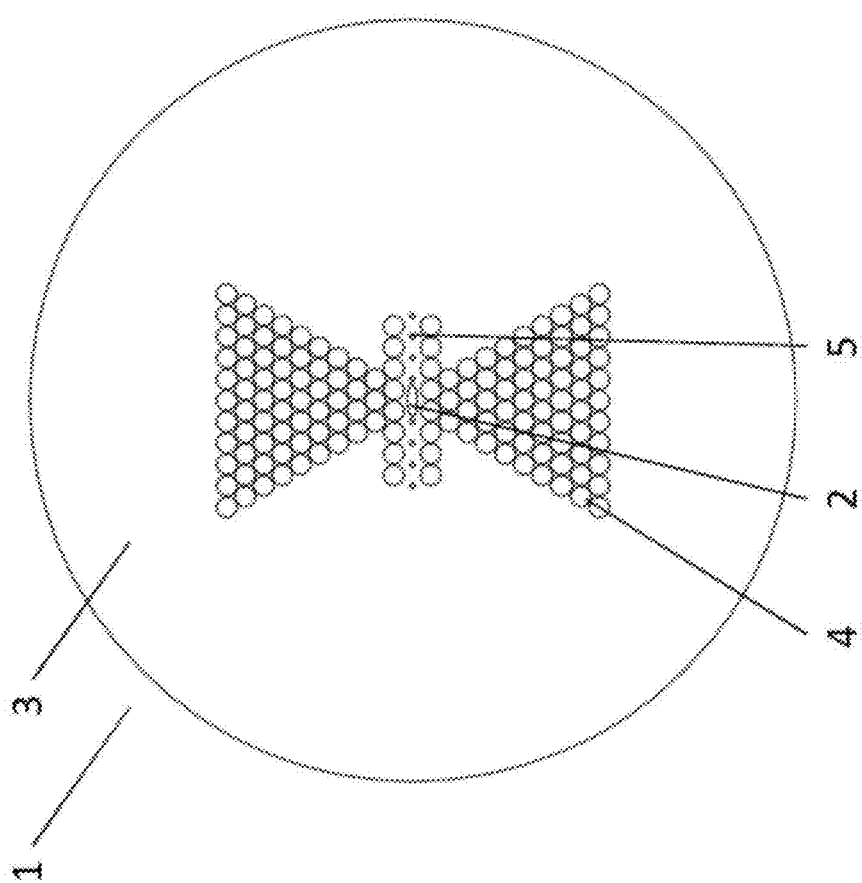
FIG. 1 shows a radial cross-section of a prior art micromachined optical fibre.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

FIG. 1 shows a radial cross-section of a prior art micro-machined optical fibre 1 of the "butterfly MOF" type, as it is described in "Shear stress sensing with Bragg grating-based sensors in microstructured optical fibers", Sulejmani S. et al., OPTICS EXPRESS 20404, 22 Aug. 2013. A doped core 2 is surrounded by a cladding 3. The cladding comprises small holes (tubes) 5 and large holes 4. The large holes are organised in two side holey structures. The core 2 can be circular or elliptical. The use of the "butterfly MOF" for sensing shear load when embedded in a host material is also described in this document. In order to reduce cross-sensitivity between shear load and transverse load, the orientation of the MOF structure is such that the line defined by the small holes, corresponding to a first mirror symmetry axis is positioned at an angle of 45° with respect to a first shear load sensitive direction in the host material, e.g. a glue layer. The cross-sensitivity is though still relatively large, which also reduces selectivity for measuring pure shear load. The (cladding of this) fibre can for instance have an outer diameter d of 125 micrometer. The small air holes 5 can have for instance a diameter of 0.8 micrometer, and can be positioned at a pitch of 3.5 to 4 micrometer. The ratio of diameter over pitch for the small air holes 5 is for instance below 0.5, for instance 0.23. The core 2 can for instance have a diameter of 1 to 5 micrometer. The large air holes 4 can have a diameter of 3.3 to 4 micron, and can for instance have a pitch of 3.5 to 4 micrometer. The ratio of diameter over pitch for the large air holes 4 is preferably within the range of 0.95 to 0.99.

Figure 2:
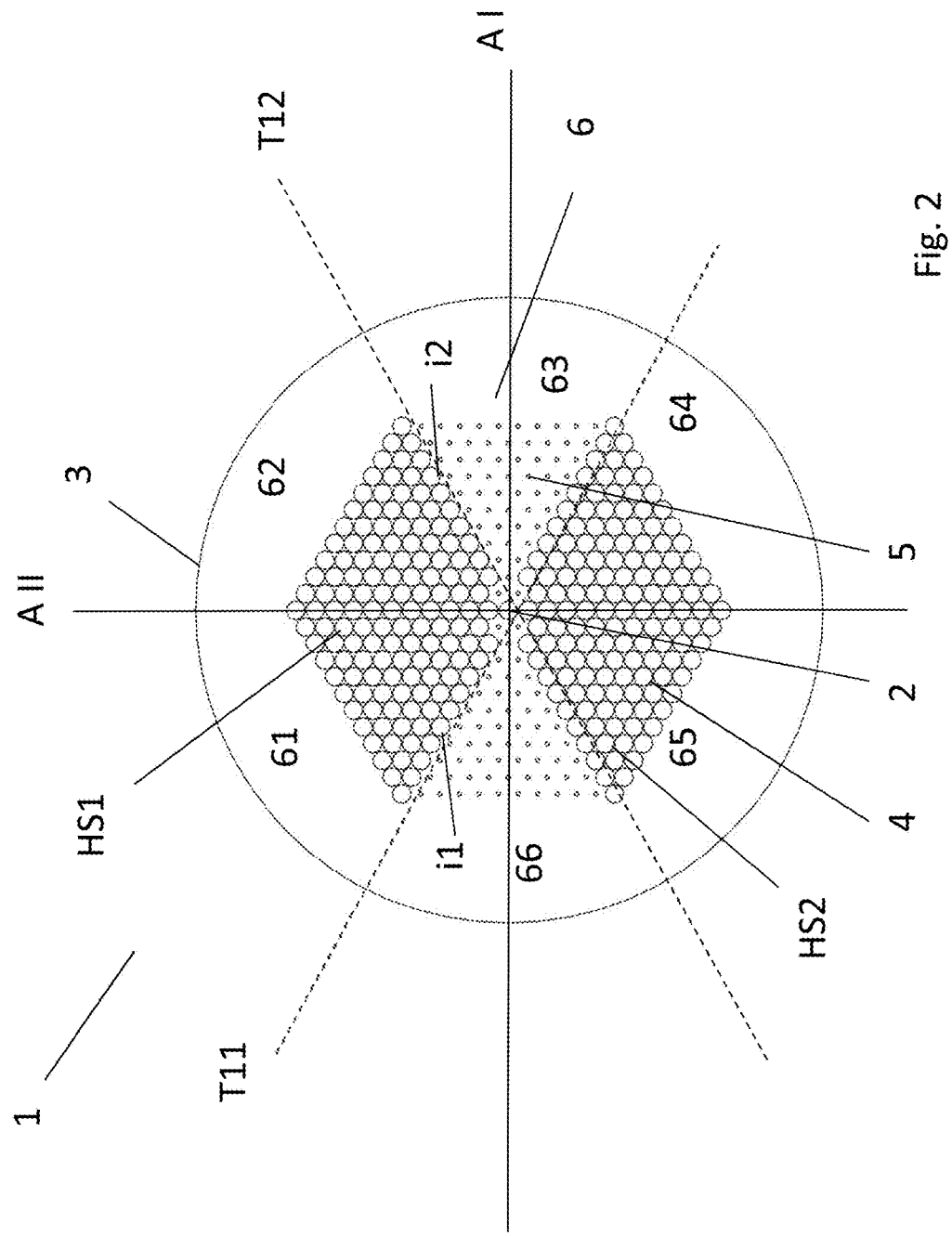
FIG. 2 shows a radial cross-section of a micro-machined optical fibre according to embodiments of the present invention.
Figure 8B:
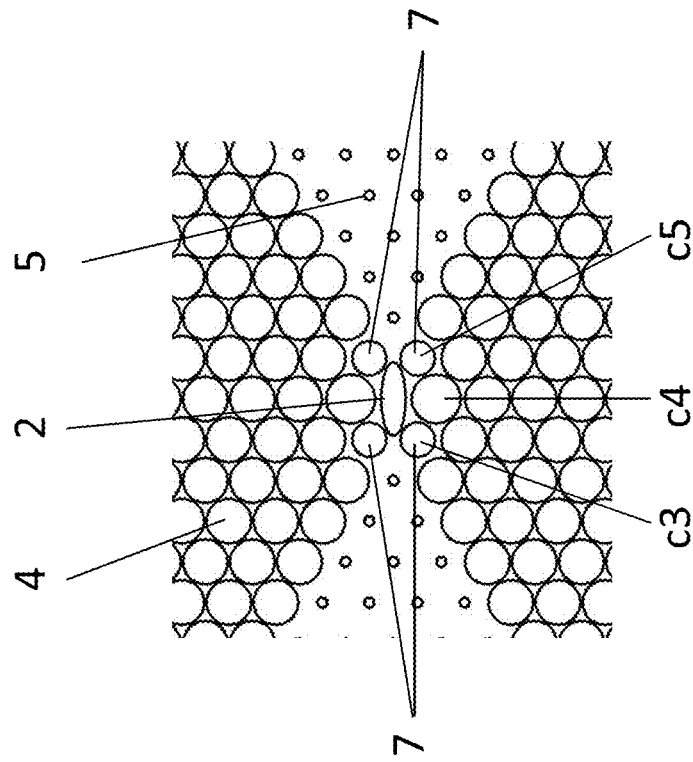
FIG. 8(b) illustrates a radial cross-section of a micro-machined optical fibre according to a further embodiment of the present invention.

FIG. 2 shows a radial cross-section of a micro-machined optical fibre 1 according to embodiments of the present invention. The MOF 1 comprises a doped core region 2 embedded in a cladding layer 3, and comprises a plurality of longitudinal tubes, which can be filled with air or a gas. A radial cross-section of the optical fibre comprises a central hexagonal portion 6 comprising a plurality of holes arranged according to a hexagonal grid surrounding a core section 2, each hole corresponding to a respective tube, within a hexagonal boundary (61, 62, 63, 64, 65, 66) of the grid. The plurality of holes comprises holes of a first type, relatively larger holes 4 of preferably equal diameter, and holes of a second type, relatively smaller holes 5 of preferably equal diameter. The tubes/holes are arranged in a biaxial mirror-symmetric configuration, with respect to mirror axes AI and AII, which are preferably orthogonal. The holes of the first type are arranged in two side holey structures HS1 and HS2 comprising distinct sub-grids of the hexagonal grid. Each of the side holey structures HS1 and HS2 is defined by respective outer boundaries corresponding to portions (sections 61, 62 and sections 64, 65 respectively) of the hexagonal boundary of the grid and respective inner boundaries (e.g. i1 and i2 for HS1), characterized in that outer tangential lines T11 and T12 to the respective inner boundaries i1 and i2 cross each other at the opposed side of the core section 2 with respect to the side of the respective side holey structure. The core section can be circular, as is depicted for instance in FIGS. 2 and 8 (a), but can also have other shapes, as for instance elliptical.

The new MOF structures according to embodiments of the first aspect of the present invention, especially the specific orientation of the tangential lines T11 and T12 as explained above, for both holey structures, causes a reduced sensitivity to transverse load in the core region of the fibre when embedded. At the same time sensitivity to shear load is improved. This is supported by simulation results, some of which are depicted in FIG. 6. FIGS. 6 (a) and (b) depicts a visual representation of simulation results for the transverse stress in the region around the core 2, for the MOF being embedded in a host material that is transversely loaded. FIG. 6 (a) relates to an optical fibre according to embodiments of the present invention, while FIG. 6 (b) relates to a prior art micro-machined optical fibre being of the "V-fibre MOF"-type. Under the same border conditions, the structure according to embodiments of the present invention does not show any stress being built up in the region around the core 2, while a lot of stress is generated in the region around the core 2 for the V-fibre MOF. This clearly illustrates that the cross sensitivity between shear load and transverse load is reduced and a better selectivity for shear load measurement can be obtained.

Figure 8A:
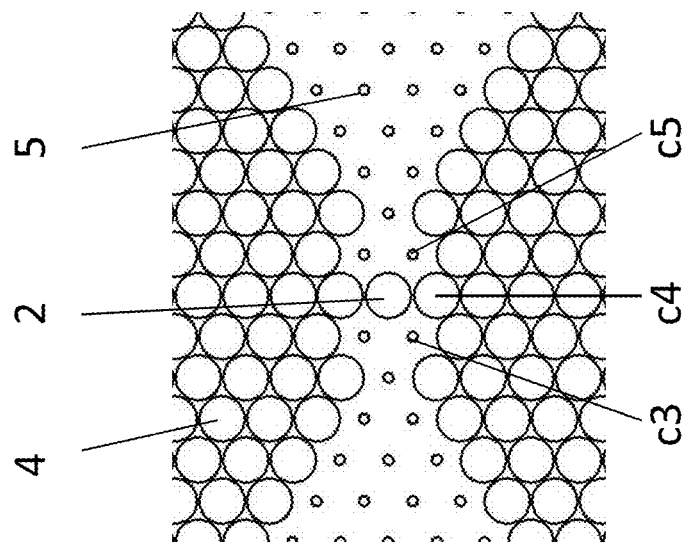
FIG. 8 (a) shows a radial cross-section of a micro-machined optical fibre according to embodiments of the present invention, as depicted in FIG. 2.

The side holey structures HS1 and HS2 are preferably defined by boundaries defining a shape of the rhomb type. According to preferred embodiments, the hexagonal grid within the side holey structures, corresponding to the shape of the rhomb type, is filled completely with holes of the first type, except for two grid positions adjacent to the core section 2. Also, the core section itself is preferably occupying the central grid position, and results as being part, e.g. occupies a grid position, of both side holey structures Each of the respective side holey structures comprises three grid positions directly adjacent to the core section 2, which is illustrated for instance in FIG. 8 (a), (b). Preferably the two outer grid positions (positions c3 and c5 for the lower holey structure FIG. 2) of these three grid positions comprise holes of a second type, while the central grid position of (c4) these three grid positions comprises a hole of the first type. The holes of the second type are preferably smaller than the holes of the first type. The holes of the second type are preferably also completely or at least partially filling the grid positions of the hexagonal grid within the hexagonal portion, outside the first and second holey structures. A detail of the MOF structure of FIG. 2 is also illustrated in FIG. 8 (a).

An alternative embodiment of the MOF of the present invention, is nearly identical to the MOF described in relation to the embodiment described in relation with FIG. 2, but differs therefrom in that a third type of holes is present at certain grid positions. The core section 2 can again be circular or elliptical. For instance, as depicted in FIG. 8 (b), preferably, the third type of holes is larger in diameter than the second type of holes and smaller than the first type of holes 7. The MOF preferably comprises holes 7 of the third type in the two outer grid positions (positions c3 and c5) of the three grid positions directly adjacent to the core section 2, while the central grid position (c4) of these three grid positions comprises a hole of the first type. The holes of the second type are preferably completely or at least partially filling the grid positions of the hexagonal grid within the hexagonal portion, outside the first and second side holey structures.

In certain embodiments, a hole can be present at every grid position of the central hexagonal portion, except for the grid position corresponding to the core.

The properties of an embodiment according to FIGS. 2 and 3a has been studied by means of simulations. The large air holes ('first type' air holes) had a diameter of 3.7 μm and the smaller air holes ('second type') had a diameter of 0.8 μm. The ratio of the diameter of the air holes of the first type to its pitch was 95%. The microstructure design then yields a modal birefringence of 5.3E-4 and a sensitivity for shear loading of 41.8 μm/MPa when embedded in a purely shear loaded block. This particular simulation result has been achieved for an isotropic linear elastic material with an elastic modulus of 1.1 GPa and a Poisson coefficient of 0.38.

Figure 9:
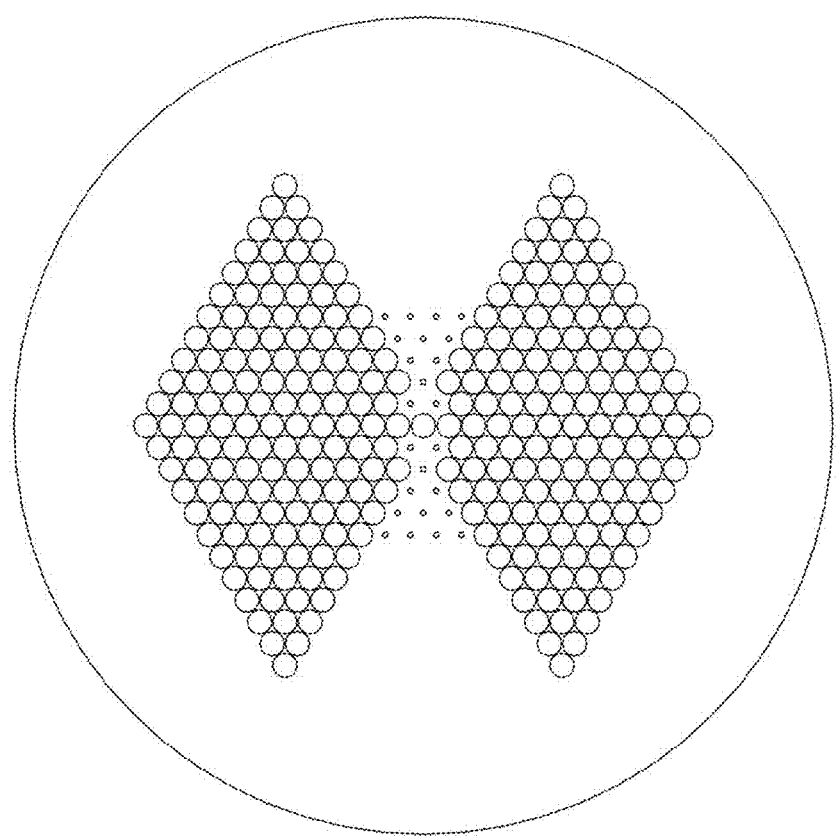
FIGS. 9 to 13 illustrate further embodiments of the first aspect of the present invention.

FIG. 9 illustrates another embodiment of the first aspect of the present invention. This figure illustrates a radial cross-section of an alternative design with only 5 rings of small ('second type') air holes within the central hexagonal portion, while the embodiment described in relation with FIG. 2 featured 11 rings of second type air holes. The central grid position of the three grid positions adjacent to the core section comprises a hole of the first type. The two outer grid positions of these three grid positions comprise holes of the second type. Based on simulation, this microstructure design yields an adequate modal birefringence of 5.3E-4 and sensitivity for shear loading of 43.8 pm/MPa. These values show that a microstructured optical fibre with this microstructure geometry can be used for shear load sensing in a composite structure.

Figure 10:
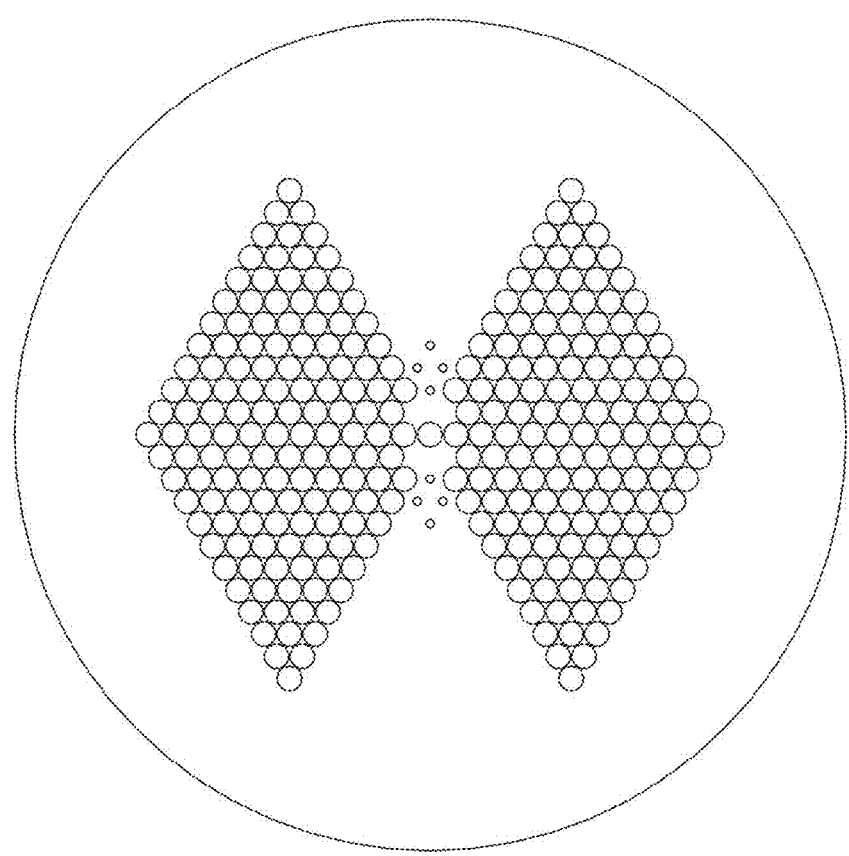

FIG. 10 illustrates a radial cross-section of an alternative embodiment with only 8 air holes of the second type, arranged close to the core section, for instance within the 5 inner hexagonal rings (meaning to also include the 5$^{th}$ ring). These air holes have a diameter of 1.2 μm, while in the embodiments described in relation with FIG. 2 the second type of air holes had a diameter of 0.8 μm. The reduction of the number of second type air holes present in this design, is compensated by increasing their size to ensure that the modal birefringence is maintained at an adequate level of 3.8E-4, based on simulation. The sensitivity to shear loading is 42.5 pm/MPa. Note that the central grid position of the three grid positions adjacent to the core section comprises a hole of the first type. The two outer grid positions of these three grid positions comprise no holes.

Figure 11:
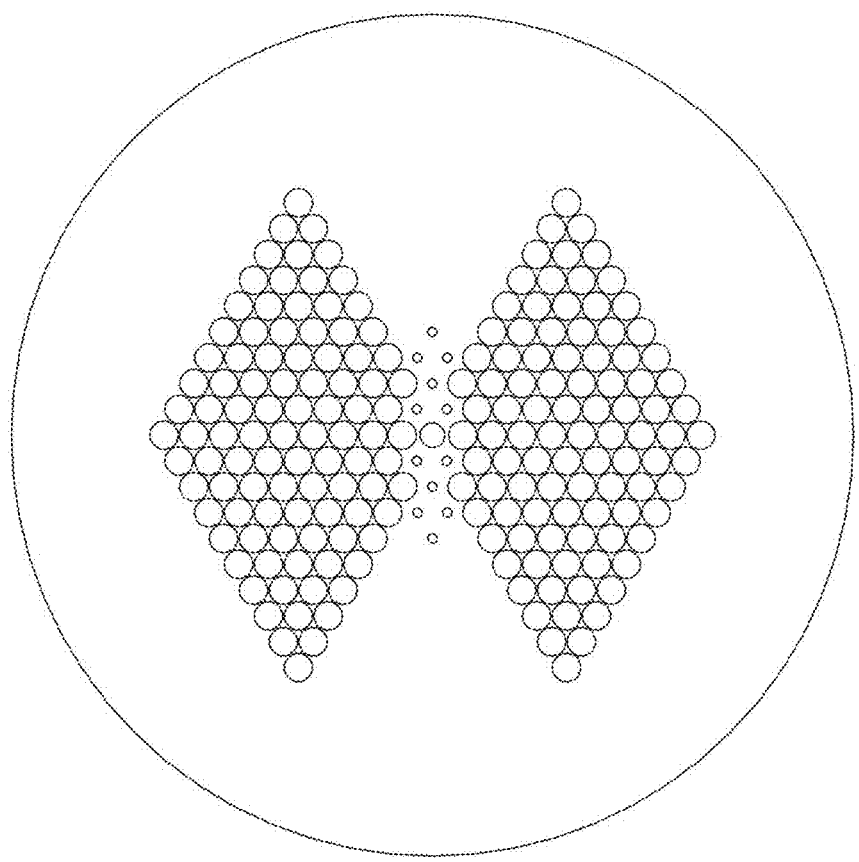

FIG. 11 shows a radial cross-section of an alternative embodiment with only 9 rings of air holes of the first type, and maximum 5 rings of air holes of the second type. The size of these air holes is enlarged compared to their size in the embodiment described in relation with FIG. 2, such that the ratio of the diameter of the air holes of the first type to its pitch is kept at 95%. This ensures that the area in the cross-section covered by the air hole microstructure remains sufficient to achieve a modal birefringence of 4.4E-3 and a sensitivity to shear loading of 35.6 pm/MPa, based on simulation. Note that the central grid position of the three grid positions adjacent to the core section comprises a hole of the first type. The two outer grid positions of these three grid positions comprise holes of the second type.

Figure 12:
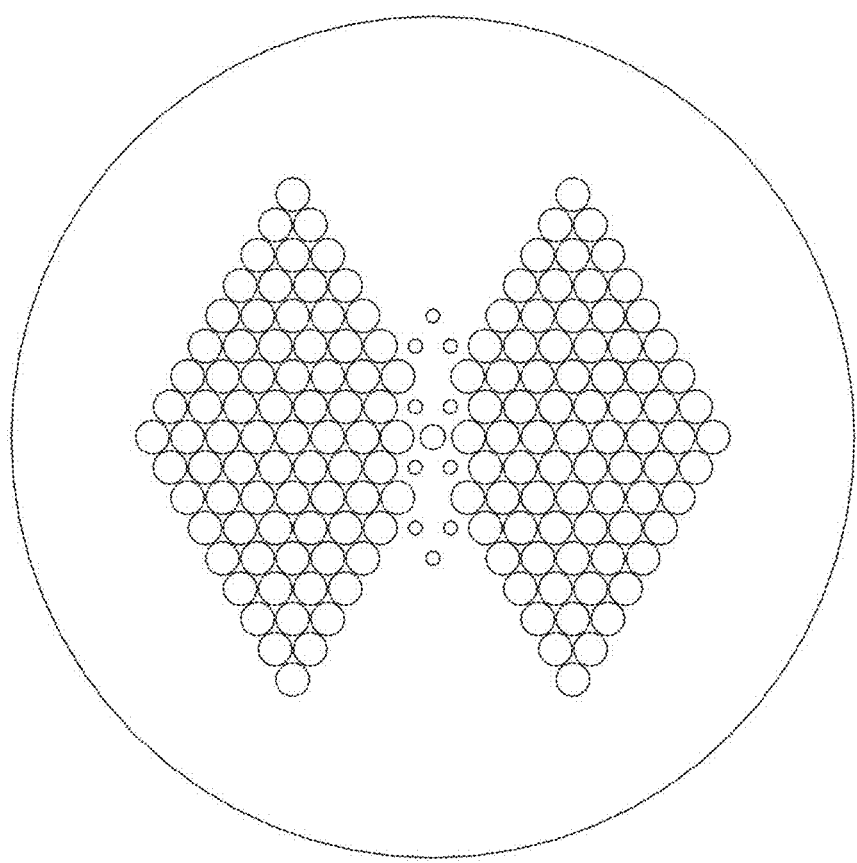

FIG. 12 shows a radial cross-section of an alternative embodiment with only 8 rings of air holes of the first type, and maximum 10 air holes of the second type. The size of these air holes is enlarged compared to their size in the embodiment described in relation with FIG. 2, such that the ratio of the diameter of the air holes of the first type to its pitch is kept at 95%. This ensures that the area in the cross-section covered by the air hole microstructure remains sufficient to achieve a modal birefringence of 2.8E-3 and a sensitivity to shear loading of 35.9 pm/MPa, based on simulation. Note that the central grid position of the three grid positions adjacent to the core section comprises a hole of the first type. The two outer grid positions of these three grid positions comprise holes of the second type.

Figure 13:
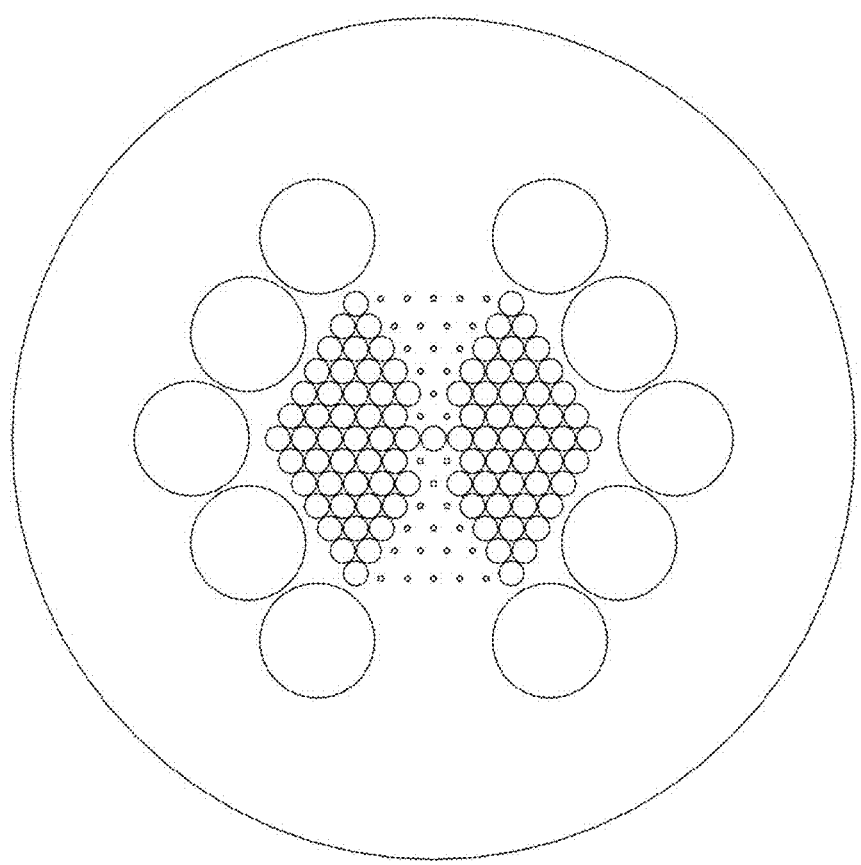

FIG. 13 shows a radial cross-section of an alternative embodiment in which a fourth type of air hole is introduced, when compared to a configuration similar as the one described in relation with FIG. 2. The embodiment described in relation with FIG. 2 only features two types of air holes with different sizes, wherein moreover at all grid positions different from the core position, holes are present. Here, around the 6 rings of air holes of the first and the second type, 6 additional very large (17 μm diameter) air holes are placed in the cladding layer, outside the central hexagonal portion. This microstructure design yields an adequate modal birefringence of 5.1E-4 and sensitivity for shear loading of 44.4 pm/MPa, based on simulation.

Figure 7:
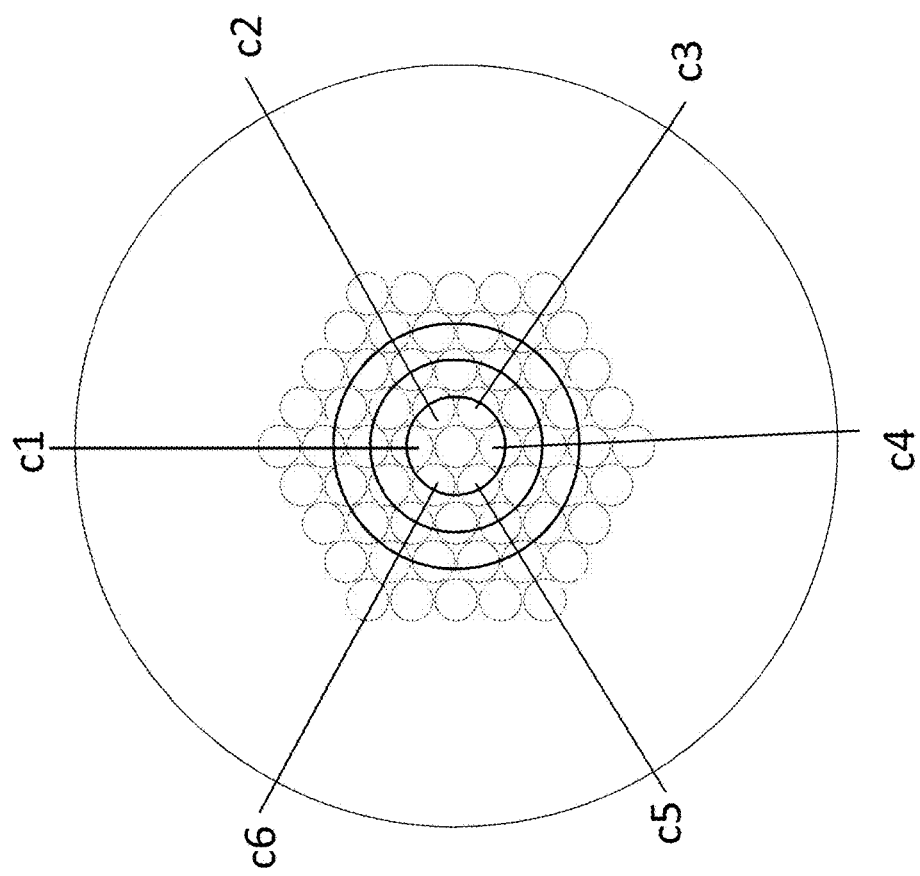
FIG. 7 illustrates the concept of "hexagonal rings" and defines nomenclature for the hexagonal grid positions directly adjacent to the core section.

The hexagonal grid of the hexagonal portion preferably comprises at least 4, more preferably at least 8 hexagonal rings, for instance 11 hexagonal rings. The concept of "hexagonal rings" is also illustrated in FIG. 7, and is clear to the skilled person.

Figure 5:
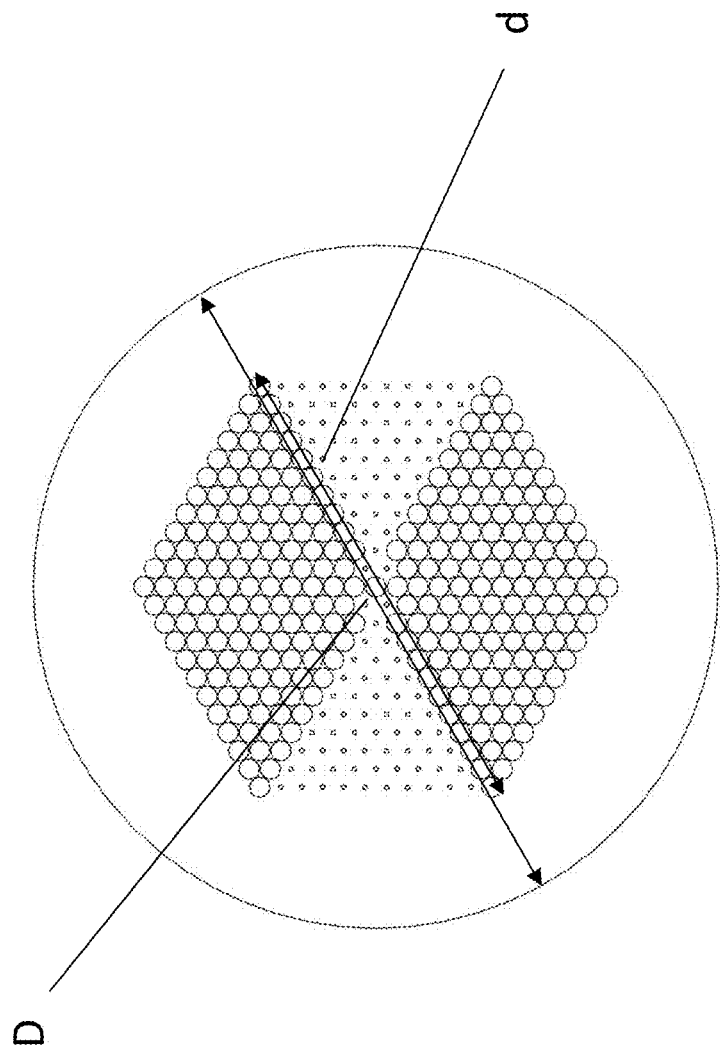
FIG. 5 illustrates a radial cross-section of a micro-machined optical fibre according to embodiments of the present invention.

Also, as illustrated in FIG. 5, the diameter d of the hexagonal portion 6 (defined as its largest diameter) is relatively larger than the one known from the prior art. Indeed, preferably the ratio of the diameter d over the diameter D of the fibre (of its cladding) is larger than 60%, more preferably more than 75%, more preferably more than 90%.

Figure 4B:
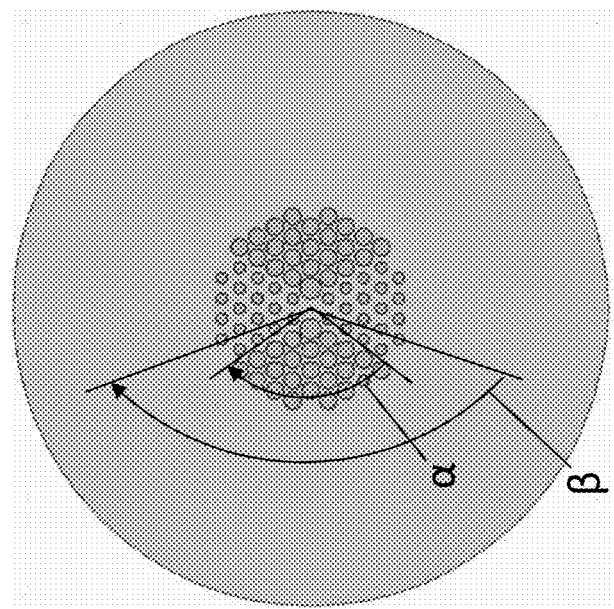
FIGS. 4 (a) and (b) illustrates an aspect of the present invention by comparing a cross-section of a micro-machined optical fibre according to embodiments of the present invention with a radial cross-section of a prior art micro-machined optical fibre being a "V-fibre MOF".
Figure 4A:
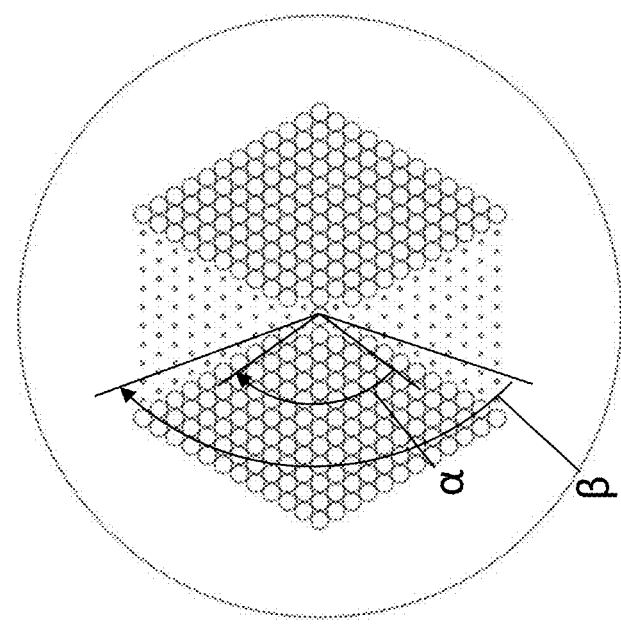

The MOF structures according to embodiments of the present invention, are preferably such that the angle under which the centre of the core sees the side holey structures is larger than 120°. This is illustrated in FIGS. 4 (a) and (b), wherein a comparison is made of the angle β with the corresponding angle α for a "V-fibre MOF", which is smaller.

It is preferred that the relative surface of the holes with respect to the total surface of the side holey structures is larger than 82%, more preferably larger than 88%.

The (cladding of the) fibre can for instance have an outer diameter d of 125 micrometer. The small air holes 5 can have for instance a diameter of 0.8 micrometer, and can be positioned at a pitch of 3.85 micrometer. The ratio of diameter over pitch for the small air holes 5, holes of the second type, is for instance below 0.5, for instance 0.21. The core 2 can for instance have a diameter of 1 to 5 micrometer. The large air holes 4, holes of the first type, can have a diameter of 3.3 to 4 micrometer, for instance 3.6575 micrometer. The constant pitch of holes, and thus of the first type and of the second type, and if present of the third type, can for instance be in between 3.5 and 4 μm. It can be for instance 3.85 micrometer. The ratio of diameter over pitch for the large air holes 4 is preferably larger than 0.95, more preferably larger than 0.99. The core 2 can be circular, elliptical or even asymmetric and can have a diameter in between 2 and 5 micrometer. It is preferably doped, preferably GeO2 doped. The doping level is preferably between 0 mol % and 20 mol %.

Figure 3:
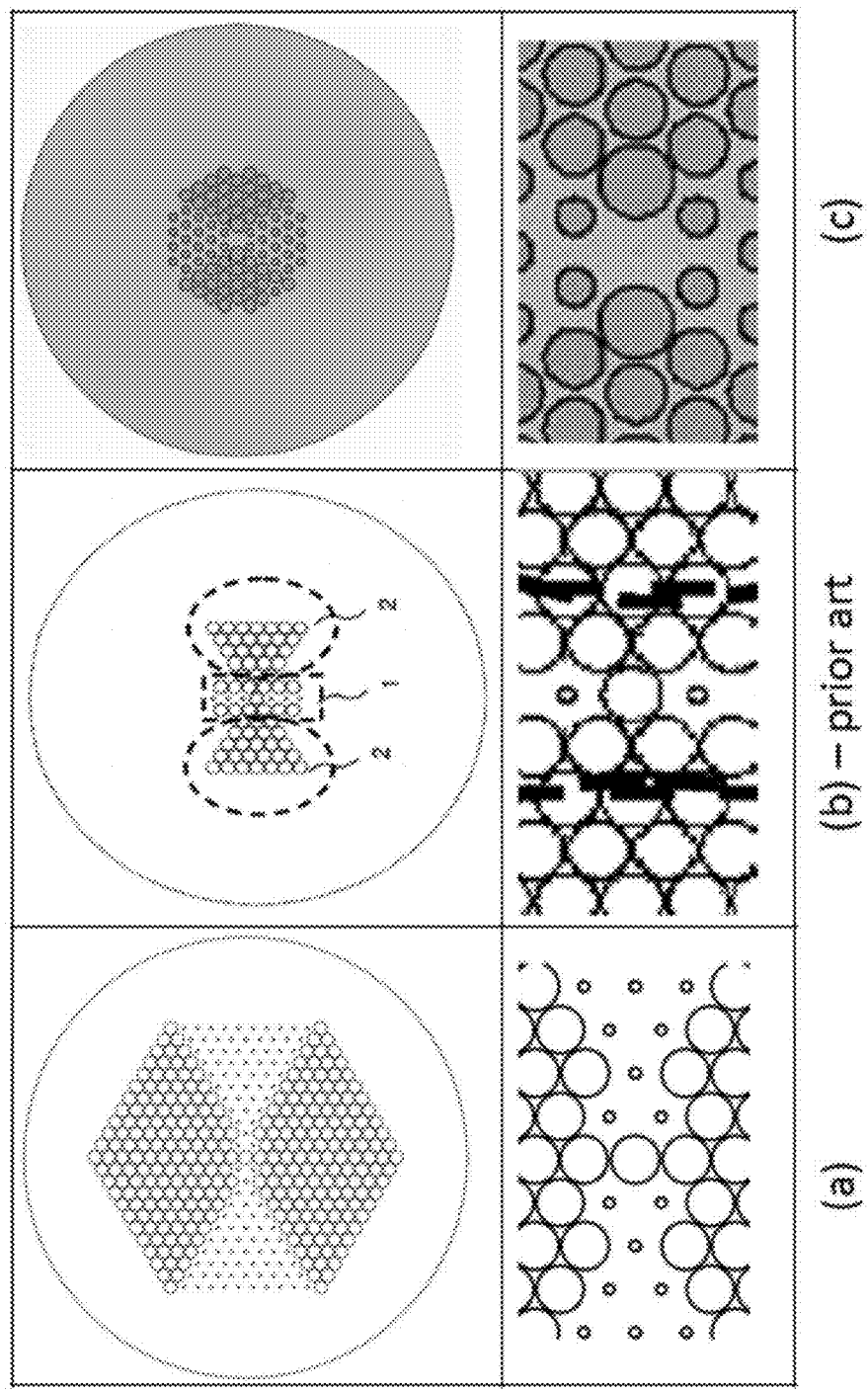
FIGS. 3 (a), (b) and (c) is a line-up of a micro-machined optical fibre according to embodiments of the present invention, and prior art MOF structures being a "butterfly MOF" and a "V-fibre MOF" respectively.

FIGS. 3 (a), (b) and (c) provide a line-up of a micromachined optical fibre according to embodiments of the present invention "SS-MOF" (a), and prior art MOF structures being a "butterfly MOF" (b) and a "V-fibre MOF" (c). The upper figures provide radial cross-sectional views, while the lower figures provide details on the region close to the core 2, including the six grid positions directly adjacent to the core. It is clear that the new design features a much larger number of small air holes, holes of the second type, than the butterfly MOF. In the butterfly MOF, only 9% of all air holes are small, while for the new MOF design, 28% of the air holes have a small diameter. It can also be noted that in the new designs, only two large air holes, holes of the first type, are directly adjacent to the core 2, one for each holey structure. Also, next to the large side structures of large air holes along the horizontal direction in the butterfly MOF, there are also several large air holes in the vertical direction. These extra air holes serve for optical confinement, while in the new design the small air holes, holes of the second type, ensure optical confinement. The number of rings of air holes is larger for the new design, when compared to the prior art. The new MOF design is based on more than 4, or more than 5, or more than 6, or more than 7, e.g. 11 rings of air holes.

The V-fibre MOF does not feature a doped inclusion in the core region, as it was not designed for fibre Bragg grating inscription or Bragg grating based sensing. The new MOF design comprises a doped inclusion in its core region. Also, the total area of air hole microstructure that covers the fibre cross section is larger for the new design than for the V-fibre design. The ratio of the diameter of the microstructure and the diameter of the optical fibre is for instance 71% for the new MOF design, while it is only 38% for the V-fibre design. The ratio of air hole diameter to its pitch of the small air holes, holes of the second type, in the new design (21%) is much smaller than that of the V-fibre design (54%). The ratio of air hole diameter to its pitch of the large air holes, holes of the first type, in the new design (95%), is much larger than that of the V-fibre design (84%).

It can also be noted that the new MOF design has a different air hole geometry enclosing the core 2. When comparing the angle under which the (center of the) core 'sees' the side holey structures, it can be concluded that this is larger for the new MOF designs (angle β) than for the V-fibre MOF (angle α). This angle can be defined, for instance clearly represented in a radial cross-section view, as the largest angle which can be defined between two straight lines connecting the centre of the core and respective outer surfaces of two air holes of the first type in the respective side holey structure. This angle is preferably larger than 120°. This is also illustrated in FIG. 4.

The sensitivity of several MOF designs when loaded transversely or in shear has been compared, when rotated at 45° and embedded in a single lap adhesive joint (SLJ). The ratio of both sensitivities (shear/transverse load sensitivity) is a representative measure for the level of cross-sensitivity. The results are listed in Table 1. These results clearly demonstrate that the new design, as disclosed in relating with FIG. 2, features a much lower cross-sensitivity between shear and transverse load than the V-MOF sensor, since the absolute value of the ratio of both sensitivities C/B is much higher. An even better performance can be expected for the alternative design disclosed in relation with FIG. 8(b).

TABLE 1

Ratio of the hydrostatic pressure sensitivity, the transverse load sensitivity and the shear load sensitivity

| | SS-MOF (embodiment as illustrated in relation with FIG. 2) | adapted V-MOF | V-MOF (M. Szpulak et al.) | Butterfly MOF |
|---|---|---|---|---|
| A. Bare fibre - hydrostatic pressure sensitivity | −8.7 pm/MPa | −8.8 pm/MPa | −4.1 pm/MPa | −17.4 pm/MPa |
| B. Fibre in SLJ - transverse (or peel) load sensitivity (fibre rotated at 45°) | −12.0 pm/MPa | −34.6 pm/MPa | −5.1 pm/MPa | −16.6 pm/MPa |

TABLE 1-continued

Ratio of the hydrostatic pressure sensitivity, the transverse load sensitivity and the shear load sensitivity

|  | SS-MOF (embodiment as illustrated in relation with FIG. 2) | adapted V-MOF | V-MOF (M. Szpulak et al.) | Butterfly MOF |
|---|---|---|---|---|
| C. Fibre in SLJ - shear load sensitivity (fibre rotated at 45°) | 104.1 pm/MPa | 97.3 pm/MPa | 19.1 pm/MPa | 59.8 pm/MPa |
| Ratio |C/A| | 11.4 | 11.1 | 4.7 | 3.4 |
| Ration |C/B| | 8.7 | 2.8 | 3.8 | 3.6 |

One could argue that the microstructure of the SS-MOF strongly resembles that of the V-MOF. However, there are some distinct differences that contribute to the much higher ratio CB of the SS-MOF.

A study was made in order to retrieve the most characterising difference(s). The V-MOF design presented by Szpulak et al. in 2006 features less rings of air holes in the microstructure, as well as possibly non-beneficial air filling factors. It was assumed that by increasing the number of air hole rings, and improving the air filling factor, the sensitivity of the V-MOF fibre can be increased. So, another MOF design, referred to as 'adapted V-MOF', was created in which number of rings of air holes increased and the air filling fractions were made similar to that of the SS-MOF.

A remaining significant difference between the SS-MOF design and the adapted V-MOF design is the extra rows of air holes, resulting in the crossing of the tangential lines T11 and T12 to the respective inner boundaries at the opposed side of the core with respect to the side of the respective side holey structure, i.e. "behind" the core, which results in a different enclosing of the core region where the optical mode is guided. The addition of these extra rows of holes results in a combination of a very high shear stress sensitivity and a low transverse stress sensitivity, which has not been presented in any MOF design before.

It will be appreciated that the fibre structures according to embodiments of the present invention are not straight forward developments of prior art fibre structures. Indeed, it is not evident to add more large holes (holes of the first type), as this would a priori make it more difficult to perform FBG inscription. Moreover, a priori, the tolerance for deviations from the angle of 45° at which the fibre has to be embedded in a host material, decreases when the opening angle of the respective side holey structures, comprising mainly holes of the first type, increases, which is detrimental for most applications. Also, when designing MOF fibres, which are used for transverse load sensing, the stress concentration in the core region is typically maximised. Here, the transverse stress concentration in the core region is minimized.

According to a second aspect of the present invention, a composite structure is disclosed comprising at least a first shear load sensitive direction, comprising a MOF according to any of the embodiments of the first aspect, wherein at least one mirror symmetry-axis of the MOF is oriented at an angle in between 30° and 60°, preferably at an angle of about 45°, e.g. 45°+−8°, or +−1°, with respect to the shear load sensitive direction.

Shear loading of the composite structure will result in a shear loading of the host material in which the MOF is integrated. This shear load will induce mechanical stress concentrations along the principal axes of the host material, which are directed at 45° with respect to the shear loading direction. By orienting the embedded MOF at an angle between 30° and 60°, preferably at an angle of about 45°, e.g. 45°+−8°, or +−1°, it will detect the induced stress concentrations and the level of birefringence of the MOF will change proportionally to the applied shear load. The composite structure could for example be (but not limited to) an adhesive bond where the MOF is integrated in the adhesive bond layer, or a fiber reinforced material in which the MOF is integrated.

According to a third aspect of the present invention, a method is disclosed for measuring shear load in a composite structure along a shear load sensitive direction of the composite structure, comprising
  embedding at least one MOF according to any of the embodiments of the first aspect in the composite structure, wherein at least one mirror symmetry-axis of the MOF is oriented at an angle in between 30° and 60° with respect to the shear load sensitive direction, preferably at an angle of about 45°, e.g. 45°+−8°, or +−1°;
  allowing light of a predetermined wavelength to pass through the fibre; measuring a level of birefringence for the light in the fibre, being indicative for the shear load in the composite structure.

According to preferred embodiments, the method comprises
  embedding at least three MOFs according to any of the embodiments of the first aspect of the present invention in the composite structure, wherein at least one mirror symmetry-axis of the MOFs is oriented at an angle in between 30° and 60° with respect to the shear load sensitive direction, preferably at an angle of about 45°, e.g. 45°+−8°, e.g. 45°+−1°;
  allowing light of respective predetermined wavelengths to pass through the respective fibres;
  measuring a level of birefringence for the light in each of the fibres;
  deriving a 2D shear load mapping of the composite structure, based on the level of birefringence for each of the fibres.

When a distributed shear load is applied to a host material in which three or more MOFs are embedded, the level of birefringence of each of the MOFs will change proportional to the induced stress concentrations at the position of the MOF. By comparing these birefringence changes of each of the MOFs relative to each other, a 2D mapping of the stress concentrations can be made. Hence, a quantitative evaluation of the 2D shear load distribution can be made.

The invention claimed is:

1. A microstructured optical fibre (MOF), comprising a doped core region embedded in a cladding layer, and comprising a plurality of longitudinal tubes, wherein a radial cross-section of the optical fibre comprises a central hexagonal portion comprising a plurality of holes arranged according to a hexagonal grid surrounding a core section, each hole corresponding to a respective tube, within a hexagonal boundary of said grid, the plurality of holes comprising holes of a first type and holes of a second type and arranged in a biaxial mirror-symmetric configuration, wherein said holes of said first type are arranged in two side holey structures comprising distinct sub-grids of said hexagonal grid, each of said side holey structures being defined by respective outer boundaries corresponding to portions of said hexagonal boundary of said grid and respective inner boundaries, wherein outer tangential lines to said respective inner boundaries cross each other at the opposed side of said core with respect to the side of the respective side holey structure, wherein the angle under which the center of the core sees the side holey structures is larger than 120°.

2. A MOF according to claim 1, wherein said holes of a first type have a diameter which is larger than a diameter of said holes of said second type.

3. A MOF according to claim 2, wherein said side holey structures are defined by outer boundaries defining a shape of the rhomb type.

4. A MOF according to claim 1, wherein said side holey structures are defined by outer boundaries defining a shape of the rhomb type.

5. A MOF according to claim 1, wherein said holes are of the first type or of the second type.

6. A MOF according to claim 1, wherein said holes are of the first type, of the second type or of a third type, said holes of said third type being present at grid positions directly adjacent to said core section.

7. A MOF according to claim 1, wherein the relative surface of the holes with respect to the total surface of said side holey structures is larger than 82%.

8. A MOF according to claim 1, wherein said hexagonal grid comprises more than 4 hexagonal rings.

9. A MOF according to claim 8, the largest hexagonal ring which comprises holes of the first type is larger than the largest hexagonal ring which comprises holes of the second type.

10. A MOF according to claim 1, further comprising at least one Fibre Bragg grating formed perpendicularly on a longitudinal direction of said fibre.

11. A MOF according to claim 1, wherein said core section has an elliptical shape.

12. A composite structure comprising at least a first shear load sensitive direction, comprising a MOF according to claim 1 embedded therein, wherein at least one mirror symmetry-axis of said MOF is oriented at an angle in between 30° and 60° with respect to said first shear load sensitive direction.

* * * * *